INVENTORS
Aubrey K. Brewer and
Stuart L. Adelman

BY Watson, Cole, Grindle,
Watson

ATTORNEYS

United States Patent Office 3,470,373
Patented Sept. 30, 1969

3,470,373
METHOD FOR ANALYSIS AND IDENTIFICATION OF BIOLOGIC ENTITIES BY PHOSPHORESCENCE
Aubrey K. Brewer, Washington, D.C., and Stuart L. Adelman, McLean, Va.; said Brewer assignor to Litton Systems, Inc., a corporation of Maryland
Filed Oct. 18, 1966, Ser. No. 587,513
Int. Cl. G01n 23/22, 21/52
U.S. Cl. 250—71.5                     10 Claims

ABSTRACT OF THE DISCLOSURE

A method for identifying microorganisms by subjecting the organisms to be identified with radiation that will produce luminescent emissions from the organisms. A period of time sufficient to allow escape of the fluorescent portion of those emissions is permitted to elapse, and then the phosphorescent emissions are measured as to intensity and plotted against time to obtain decay rates, which are then compared with decay rates, which are then compared with decay rates of known microorganisms to provide identification.

---

This invention relates to methods and apparatus for the rapid differential identification and analysis of microbiological systems such as bacteria, cocci, bacilli, virii, etc. as well as certain proteins and various types of animal and plant cells, and the components thereof, and is especially adapted to the medical diagnosis and pathological identification of microbic diseases and tissue disorders.

At the present time all methods and means for such identifications or analyses depend on the observation of chemical or biological interactions in which the subject organisms or components take part to form at least a necessary part of the analytical procedure and which require anywhere from several hours to many months for a positive and/or reliable result to be established. In addition, elaborate and, in general, bulky and immobile laboratory facilities are required.

The general object of the present invention is to facilitate such identification, analysis, and diagnosis, and in doing so, the provisions afforded thereby reduce the necessary procedure to one which (if automated as by the use of an electronic computer) would require several minutes at the most for a reliable identification, requiring no chemical or biosynthetic techniques, and providing necessary equipment which is compact and small enough to be easily stored and to be relatively mobile.

The invention in its preferred embodiments involves methods which take advantage of the heretofore unutilized fact that microorganisms and many of their gross components emit fluorescent and phosphorescent radiation in a unique and characteristic fashion when irradiated by electromagnetic radiation of appropriate wave lengths.

The intensity of phosphorescent radiation as well as the time required for this intensity to fall off to any given fraction of the initial intensity is wholly characteristic of the particular radiative transition of the electron but not of the substance in which the electron is incorporated. It is clear then that a given array of radiators will have a given set of intensities and decay times peculiar to it. Specifically this invention represents the discovery that a given microorganism or component thereof that has among its components such an array of radiators, i.e. one in which phosphorescence is observed, will, because of the incorporation of this array in its peculiar structure, of necessity, have a signature of intensities and decay time peculiar to the organism.

It is evident by the nature of the phosphorescent mechanism, that the total intensity of phosphorescent emission from an effective multicomponent array of radiators at fixed wave lengths will have the form (1) $I_t = I_1 e^{-\lambda_0 t} + I_2 e^{-\lambda_1 t} + \ldots + I_n e^{-\lambda_n t} \equiv \sum_i I_i e^{-\lambda_i t}$ where $I_t$ is the intensity of emitted radiation from phosphorescence, each $\lambda_i$ is characteristic of a particular effective radiating state and each $I_i$ is characteristic of the amount of that effective state present in the organism; and the form of this function will be valid irrespective of alternative decay paths or parent-daughter relationships between adjacent states if no restrictions are placed on the coefficients.

It is equally evident that a distribution of $I_t$ versus time for fixed wave lengths can be fitted to a function such as (1), from which the $\lambda_i$ and $I_i$ can be determined. It is evident in addition that from a distribution $S(x)$, of emission intensity versus emission wave length (the emission spectrum) at a fixed excitation wave length there is a wave length $X_f$ corresponding to the maximum intensity of the fluorescent peak $I_f$ and another wave length $X_p$ corresponding to the maximum intensity of the phosphorescent peak, $I_p$.

Then for a given microorganism or component it is possible to write a vector, $\overline{V}$, such that $\overline{V} = \{\lambda_1, \lambda_2, \ldots \lambda_n, I_1, I_2, \ldots I_0, x_f, I_f, x_p, I_p\}$ and such that $$\sum_i I_i \equiv 1$$

and these vectors are characteristic of the microorganism or component concerned.

The vector, $\overline{V}$, is the signature of the specific microorganism or component thereof. It can be obtained by a number of means such as manually, by computer, or by equivalent instrumentation. The analytical procedure consists of comprising the signature $\overline{V}$, and the spectrum $S(x)$, of the unknown sample with a catalog or signatures and spectra of known microorganisms or components until a correspondence is found.

A convenient and efficient means of performing an analysis and/or identification employing the method described above is set forth in the following paragraphs.

Other objects and features of novelty pertaining to the invention will be apparent from the following specification when read in connection with the accompanying drawings in which certain apparatus and relevant data are illustrated as an exemplary disclosure of the invention.

Figure 4A:
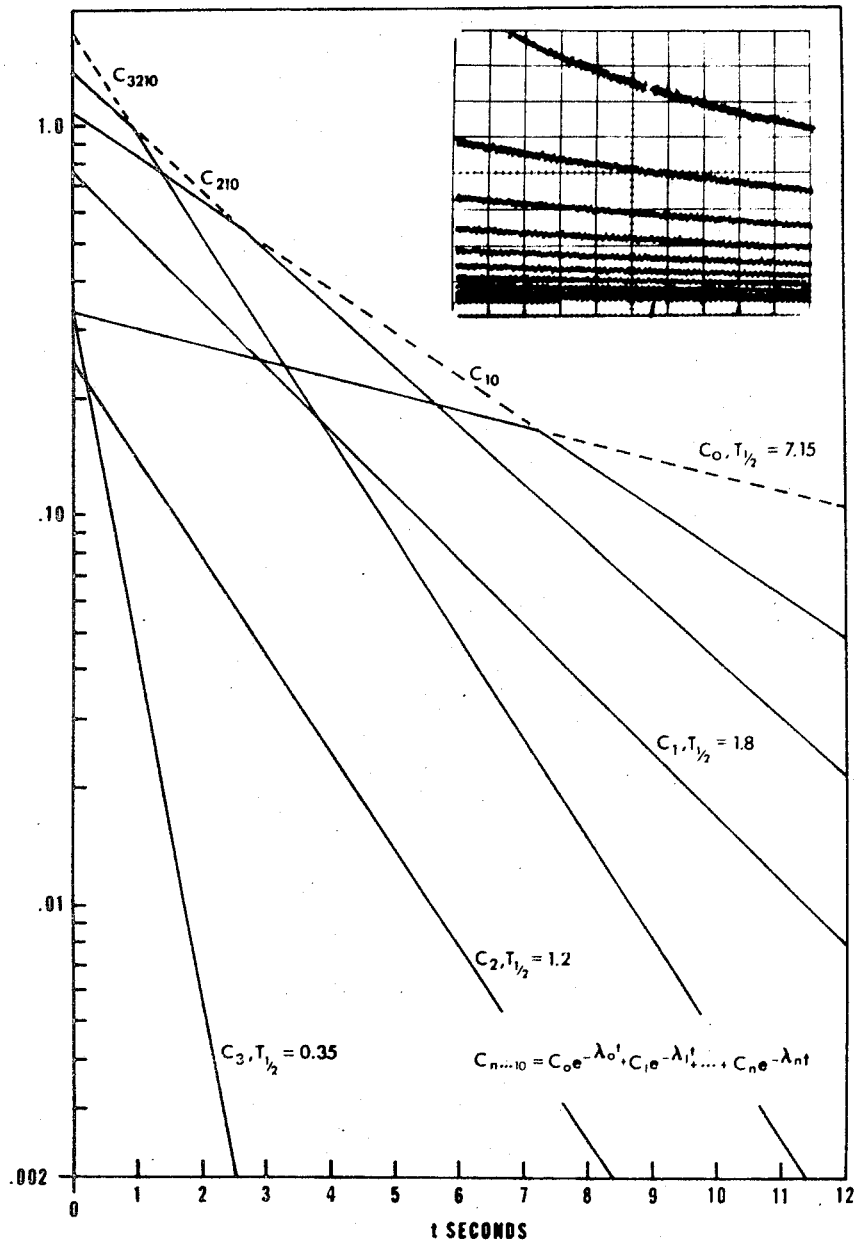
Figure 4B:
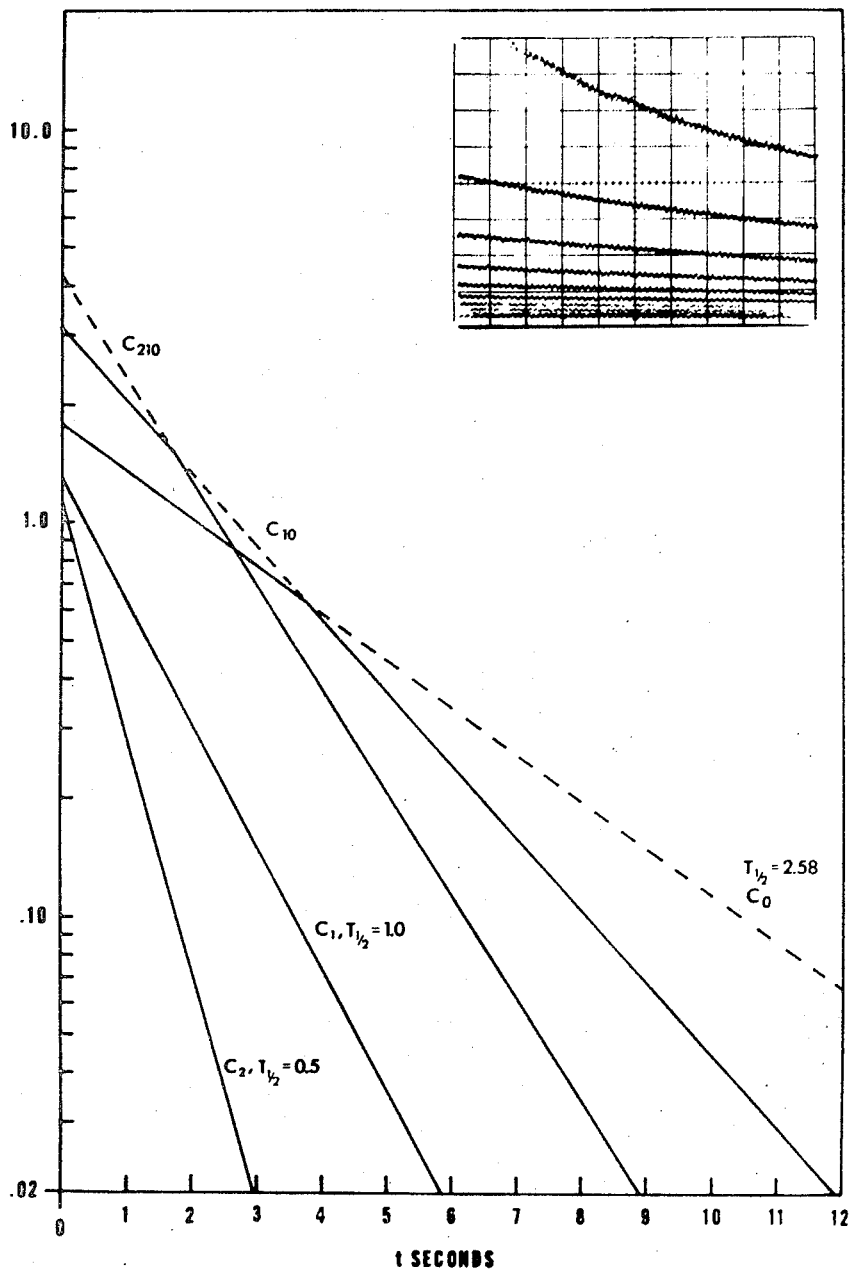
Figure 5A:
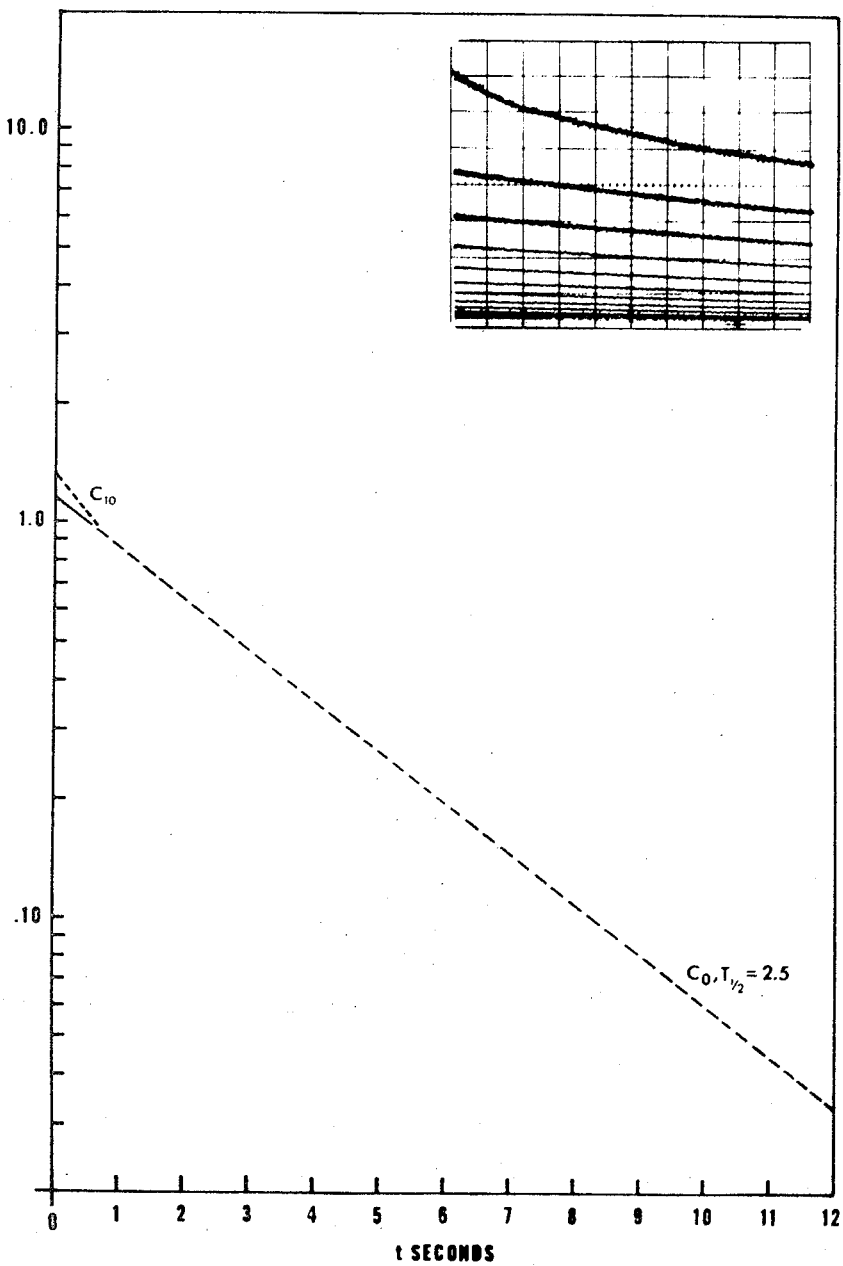
Figure 5B:
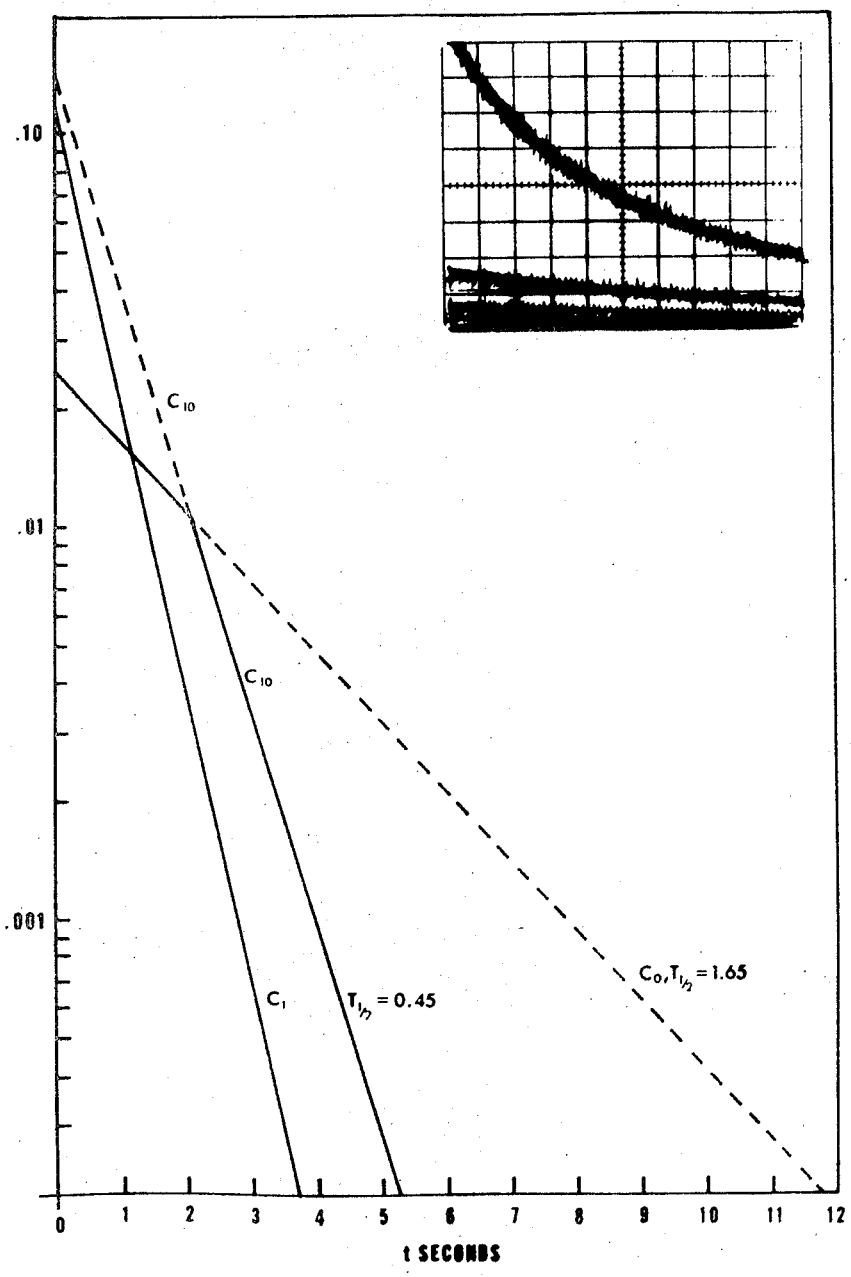

FIGURES 3A–3F inclusive are similar oscilloscope negative reproductions identifying certain substituents of named microorganisms;

FIGURES 4A and 4B are oscilloscope reproductions in negative and plots taken from them showing intensity of phosphorescent emission plotted against time and representative of certain microorganisms to be described; and FIGURES 5A–5B inclusive are similar oscilloscope reproductions of still other microorganism emissions.

Figure 1:
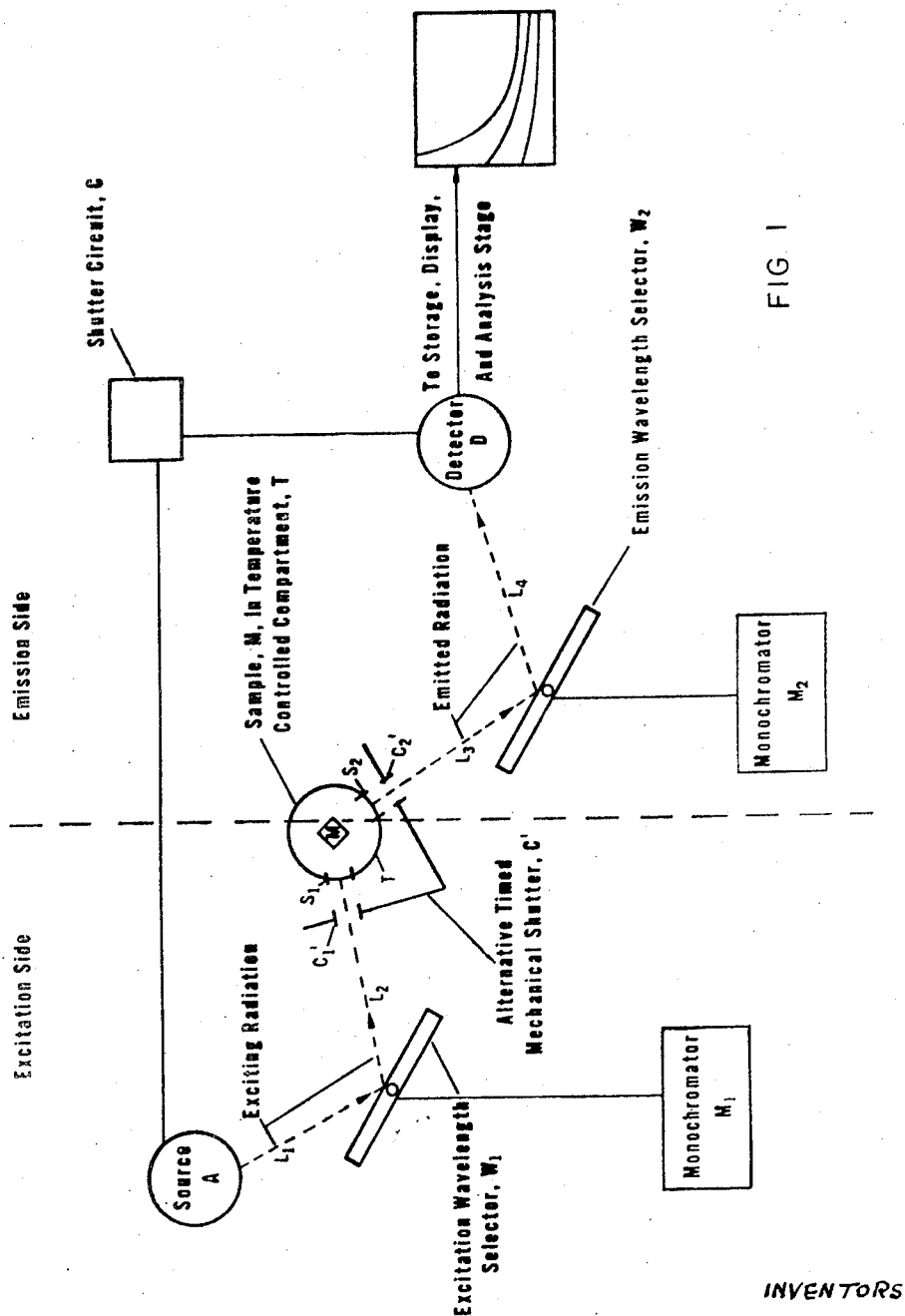
FIGURE 1 is a block diagram of suggestive apparatus for use in practicing the invention.

In one practical example of the pursuit of the novel method, the apparatus indicated diagrammatically in FIGURE 1 is employed, and in this set-up a spectrophotofluorometer, (such as, for example, by Aminco-Bowman)

was used but modified by the incorporation into the sample site of a cooling reservoir, a rotating shutter, and a Tektronics oscilloscope. The Aminco-Bowman instrument is of the type disclosed in Bulletin 2392-C, published and copyrighted by American Instrument Company, Inc. in 1964, and covered by United States Patents 2,971,429 and 3,092,722.

Since fluorescence is in general confined to the first $10^{-8}$ seconds after the end of excitation, the speed of the shutter employed was timed to exclude emitted radiation from the detector until the fluorescent intensity had become negligible. Similarly, the study of phosphorescent phenomena in biologic systems generally requires cooling to temperatures below 100K (or structural orientation by other means such as an electrostatic or magnetic field) and for this purpose, a liquid nitrogen reservoir is convenient. In FIGURE 1 the light source A is by preference a Xenon lamp capable of yielding electromagnetic radiation covering a range of wave lengths from $10^2$ to $10^3$ millimicrons, this radiation being controlled by a shutter system indicated diagrammatically at C or $C^1$.

The sample M is placed in the cooling compartment T and maintained, in this specific example, at a temperature of approximately 89° K.

An excitation wave length selector is shown at $W_1$ this element being for example, a diffraction grating, which is operatively associated with a monochromating device $M_1$. In the exemplary process the range of monochromators employed was 200–800 m$\mu$.

The shutter $C'$, by known means, is so timed that it is capable of stopping all emitted radiation from entering the detector D whose emission time from the sample after excitation is short enough to be characteristic of fluorescent rather than phosphorescent decay. Alternatively, an electronic shutter circuit suggested diagrammatically at C may be employed for the purpose.

An example of a suitable detector for use in the installation, is a 1P28 photomultiplier tube powered by a 900 v. battery power pack in order to avoid non-linear factors involved in the use of a microphotometer amplifier and an alternating current line.

In operation, following FIGURE 1, the shutter is turned on, the light from source A impinging on the wave length selector $W_1$ along path $L_1$, and then from the selector along path $L_2$ into the slit $S_1$, by way of the slit $C'_1$ of the mechanical shutter $C'$ (or timed by the electronic shutter circuit C in the alternative method) and falls upon the sample M.

Meanwhile, the emission wave length selector $W_2$ is set at an arbitrary fixed position within the expected phosphorescent range and the excitation monochromator $M_1$ is swept over its full range until the position of maximum intensity is found. With the excitation selector $W_1$ now fixed, the sample M is excited until there is no detectable increase in emission intensity with time. Conceivably, within the scope of the invention, it may not be necessary in some cases to saturate the sample, but the sample may be radiated for a definite predetermined period of time and the results interpreted accordingly.

The emitted radiation from sample M emerges from the compartment T through the slit $S_2$ (and then through the mechanical shutter slit $C'_2$ if such is employed), then along the path $L_3$ to the emission wave length selector $W_2$ which of course is operatively connected with the monochromating device $M_2$. The radiation then follows path $L_4$ to the detection stage D, where the signal measuring its intensity is emitted to the display and analysis stage E.

As mentioned, when no detectable increase in emission intensity with time is found or, alternatively when the predetermined arbitrary period of radiation is reached, the detector is blocked off from the sample, the shutter locked open and the excitation stopped. At the same time, the dark current base of the phototube is set at an arbitrary zero, and the time trace is set at zero along the x-axis of the oscilloscope. At that point the detector is opened to the sample, the time trace is begun, and the final stored oscilloscope picture is recorded as a function of excitation wave length, emission wave length, and time. Since the source is turned off before the detector is unblocked, freedom from both scattered light and fluorescent contamination is insured. The storage and display stage E may of course include oscilloscopes, photographs, or oscillograph screens, digitized paper or magnetic tape, or a computer memory.

In resumé then, the operation will be understood as comprising the starting of the shutter C or $C'$; then the first wave length selector $W_1$ sweeps the range of exciting radiation from the source A, normally between about 200 and about 700 millimicrons in about thirty seconds, exciting the sample M to energy states capable of radiating. The sweep of exciting radiation is stopped at the wave length which excites the maximum intensity of emitted radiation. The shutter C or $C'$ is then fixed open. Because the shutter eliminated all very shortlived emission, the excitation wave length selected corresponds to the maximum excitation of phosphorescence in the sample. Now the second wave length selector $W_2$ sweeps the range of emitted radiation and this enters the detector D and its intensity is stored as a function of emission wave length for a fixed excitation frequency. With the shutter C or $C'$ now fixed open, the radiation, either fluorescent or phosphorescent (as well as scattered) emitted by the sample M, enters the photomultiplier, or equivalent detection stage D and is stored, and/or displayed as a function of the emitted wave length.

Such a function will be called the emission spectrum of the sample at optimum excitation and written $S(x)$ where $x$ is the emission wave length. Referring generally to FIGURES 2A, 2B, 2C and 2D, for example, it will be seen that the plot of emission intensity versus emission wave length for some fixed excitation wave length has three main features: A significant peak corresponding to the scattering of the exciting radiation, called the elastic peak; a significant and often structured peak of wave length slightly longer than that of the exciting radiation; and a third significant and often structured peak whose maximum intensity corresponds to a still longer wave length than the second peak.

The second and third peaks differ in another salient respect. The mean time delay between excitation and maximum emission intensity of the elastic and second peaks is several orders of magnitude faster than that of the third peak. The second peak is called the fluorescent peak; and the third peak the one of longer duration, is called the phosphorescent peak.

At this point the omission wave length selector, $W_2$, is stopped at the wave length corresponding to the maximum intensity of the phosphorescent peak and the third stage is begun.

At fixed excitation and fixed emission wave lengths, the intensity of emission as found by the detector, D, is stored as a function of time.

Figure 2:
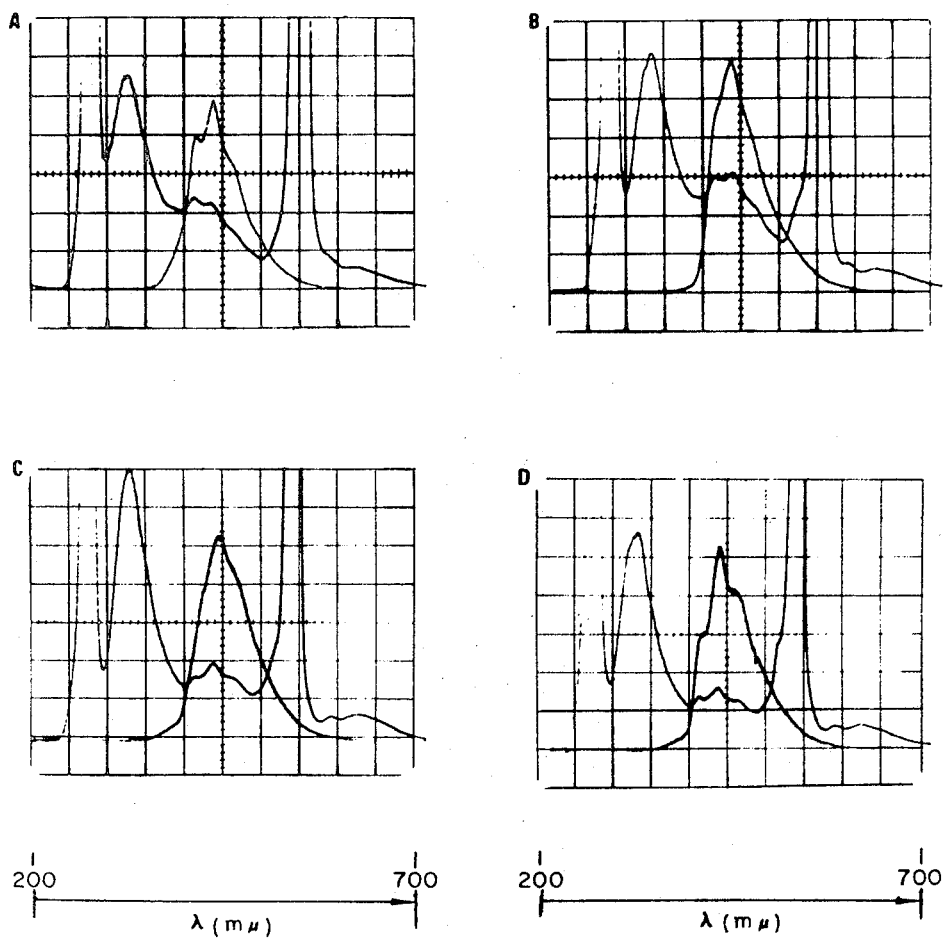
FIGURES 2A, 2B, 2C and 2D are reproductions in negative of oscilloscope screens showing intensity of emitted radiation as a function of emission wave length, and relating to four different microorganisms as will be described.

The results of such an analysis are shown below. FIGURES 2A, 2B, 2C and 2D show reproductions of an oscilloscope screen showing intensity of emitted radiation as a function of emission wave length $S(x)$. Intensity is in arbitrary linear units, wave length is shown with $x_0=200$ m$\mu$ and each $x$-scale division is 50 m$\mu$. FIGURE 2A is a display of *Bacillus Subtilis*. FIGURE 2b shows *Staphylococcus epidermidis*. For *B. Subtilis* $X_f=329$ m$\mu$, $I_f=31.5$, $X_p=412$ m$\mu$, and $I_p=17.2$. For *Staphylococcus epidermidis* $X_f=336$ m$\mu$, $I_f=30.0$, $X_p=439$ m$\mu$, and $I_p=30.0$.

FIGURE 2C shows neisseria meningitides strain 1027A. FIGURE 2D shows the same species strain L–1.

Figure 3:
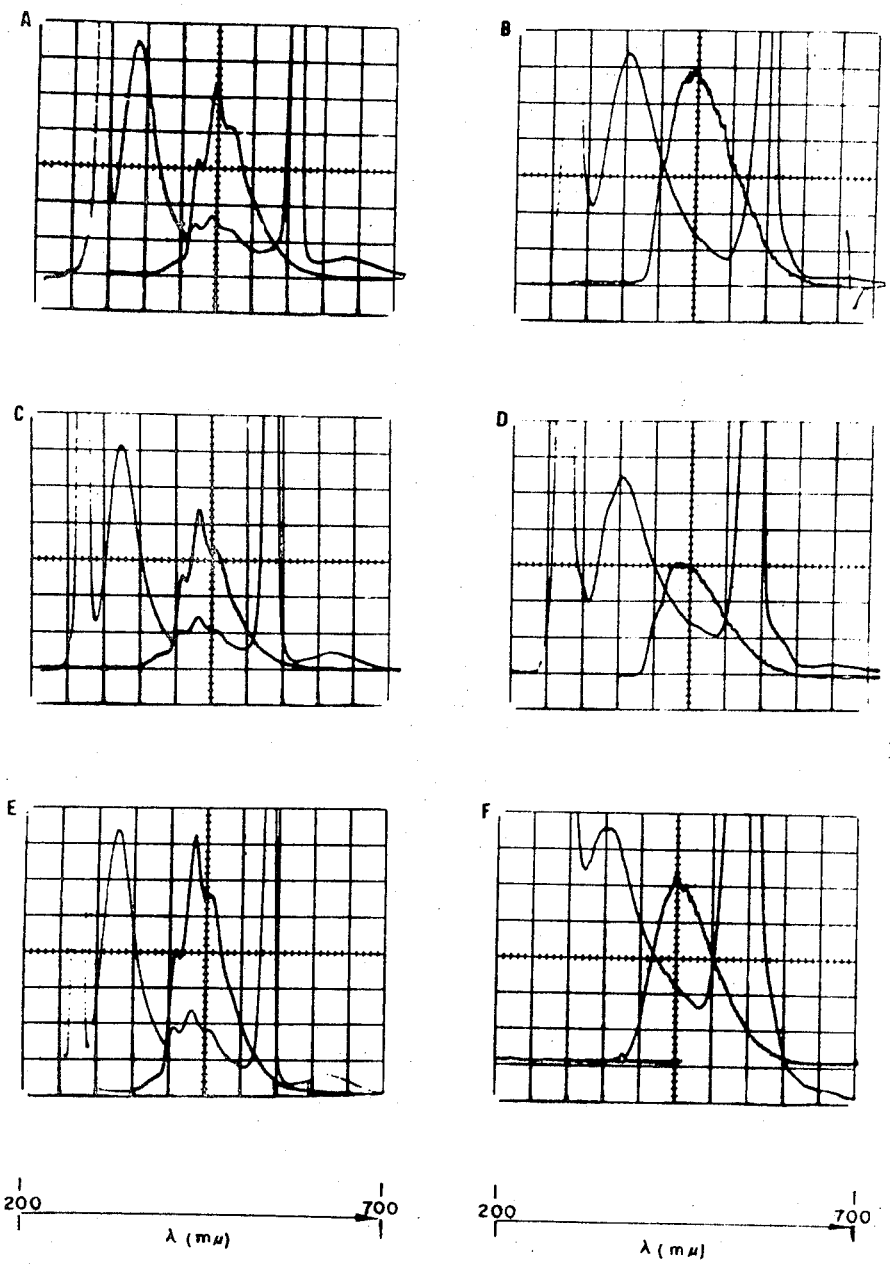

FIGURE 3 shows the same displays for two strains of *Neisseria meningitides*. FIGURE 3A is for the cell wall of strain 1027A. FIGURE 3B is for the cell sap of the same strain. FIGURE 3C is for the cell wall of strain L–1 and FIGURE 3D is for the cell sap of that strain. FIGURE 3E is for the cell wall of strain 2091B and 3F is the sap of that strain.

The whole samples were grown by known methods as, for example, in a modified Franz medium for appropriate periods at proper temperatures and the harvested cultures washed and collected by centrifuging. In the addition to the study of washed whole cell structures of the various samples, certain of the cells were morphologically disrupted by appropriate methods, into resultant substituents including the cells walls and cell saps. The substitutents were appropriately washed and filtered and the protein content of the cell wall suspensions and the cell sap were determined and adjusted to equal values by dilution before the analysis was begun.

Now coming to the indication of phosphorescent emission, reference is made to the graphs in the upper right-hand corners of FIGURES 4A, 4B, 5A–5D where the phosphorescence intensity emissions related to peaks 12 are plotted as functions of time. Intensity is in arbitrary units and time is displayed as $X_0=0$ sec. and each X-scale division is 0.1 sec.

FIGURE 4A plots the phosphorescence versus time for B. subtilis at an excitation wave length of 288 m$\mu$ and an emission wave length of 440 m$\mu$.

FIGURE 4B shows the same indication for *Staphylococcus epidermidis*.

Figure 5C:
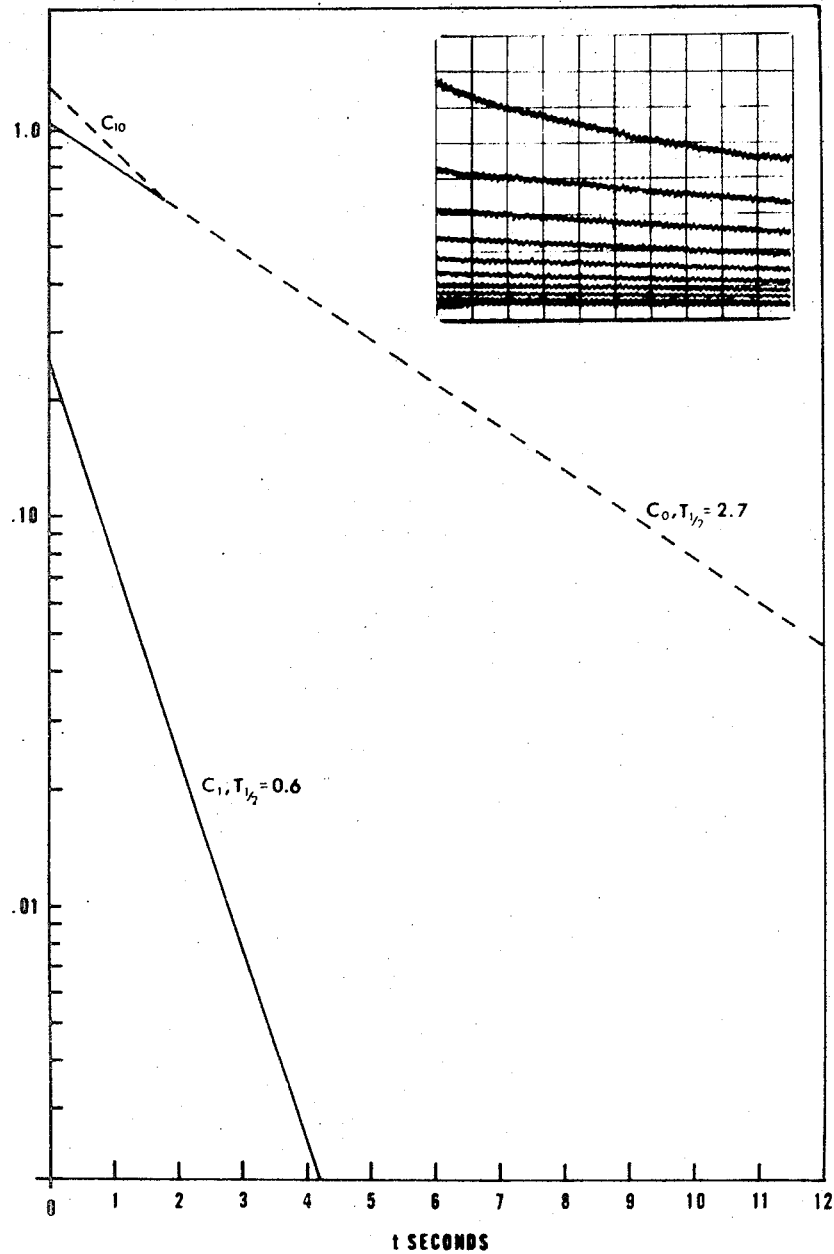
Figure 5D:
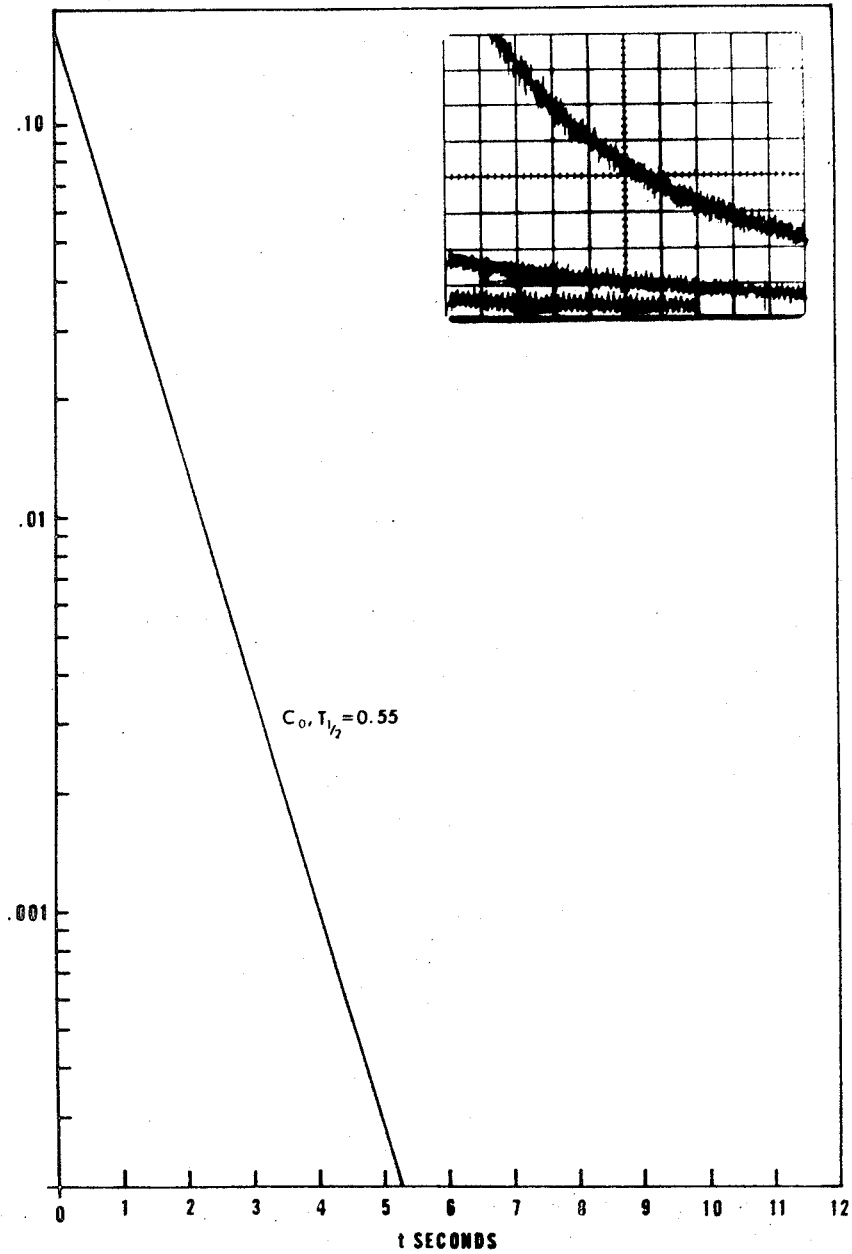
Figure 5E:
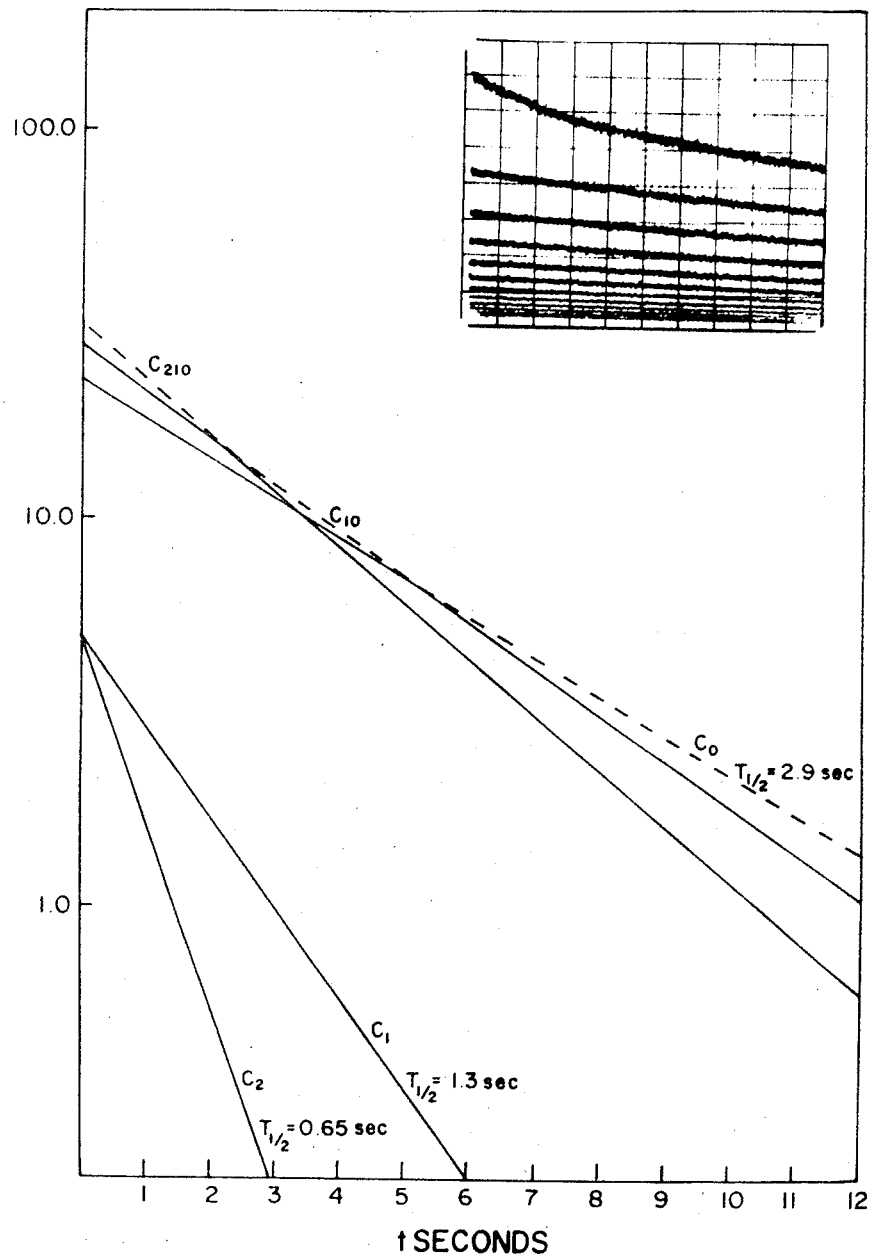
Figure 5F:
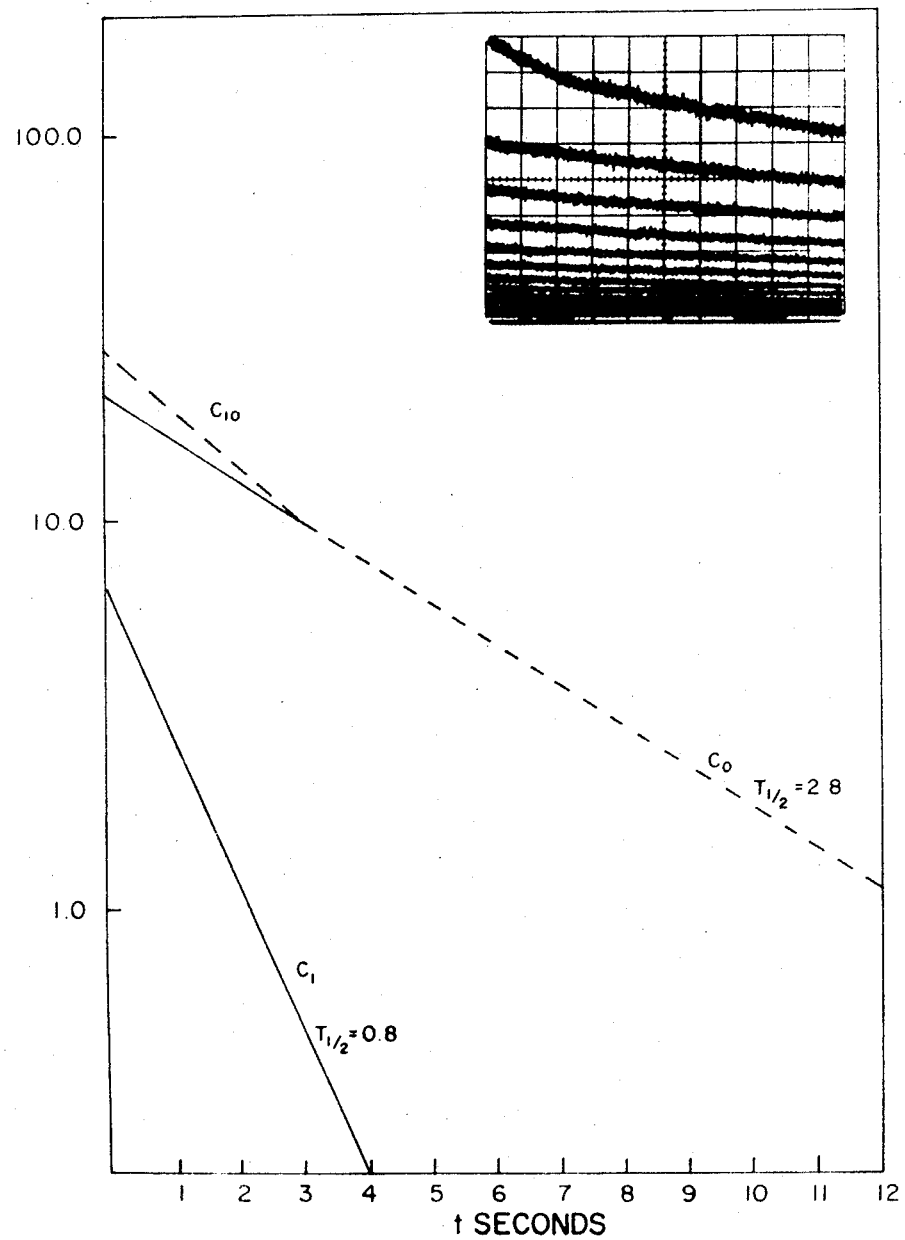

FIGURES 5A, 5B, 5C and 5D show the same plots for the cell wall and cell sap of Neisseria strains 1027A and L–1 respectively. FIGURES 5E and 5F show the same plots for the whole cells of these strains.

Further comparison can be made by the study of plots of phosphorescent emission intensity versus time on a semi-logarithmic scale wherein the $y$ measure is in arbitrary units of intensity, and $x$ measure is in seconds. (See the graphs comprising the greater portions of FIGURES 4A to 5F.) The transition from the graphs in the upper right-hand corners of these figures to the plots comprising the remaining portions of these figures may be accomplished by any suitable computer adaptations which might include a logging voltmeter, and thus clear graphs arrived at in which the logs of intensity are plotted against the channel of time.

In these graphs, the broken lines indicate raw plotted decay curves and at their points of discontinuity the successive terminations of radiation of the respective components are clearly indicated. Thus FIGURE 4A relates to B. subtilis and it will be seen that the individual straight line components, each of which has a unique slope $\lambda_i$, are clearly visible. The legend labels the curves according to the scheme $$C_n \ldots {}_{10} = C_1 e^{-\lambda_0 t} + C_2 e^{-\lambda_1 t} + \ldots + C_n e^{-\lambda_n t} \equiv \sum_{i}^{n} C_i e^{-\lambda_i t}$$

$T_{1/2}$ is defined as the time required for the intensity of emission to decay to one-half of its initial value. Evidently:

$$T_{1/2} = ln\ 2/\lambda$$

The same is clearly true for FIGURES 4B and 5A–F respectively.

It will be seen from the decay curves (FIGURES 4A, 4B, 5A–5F) that the samples studied differ both in the number of exponential terms required to produce the function, $I_T$, and in the decay constants, $\mu_i$, associated with each term.

FIGURES 4A and 4B shows the decay curves of *Bacillus subtilis* and *Staphylococcus epidermidis* respectively. We have found these functions to be characteristic of these two organisms, indeed constant, in a manner independent of whether these organisms were alive or steam autoclaved as well as independent of culture medium, preparation technique and concentration. It has been possible, as a result, to pick out samples of each of them blindly from a control batch. A salient feature of the two curves is the four component nature of the *Bacillus subtilis* decay and the three component character of the *Staphylococcus epidermidis*. In addition, it can be seen that the components have significantly different half-lives associated with them.

If one were to associate individual decay constants with single radiating components, it is possible to identify certain terms from sample to sample. In particular, we can equate component $c_1$ of the sap of Neisseria strain 1027A (FIGURE 5B) with component $c_0$ of the sap of Neisseria strain L–1 (FIGURE 5D), and further claim as identical the components $c_0$ of Neisseria 1027A wall (FIGURE 5A), $c_0$ of Neisseria L–1 wall (FIGURE 5C). It is interesting then to observe that the sap of Neisseria 1027A appears to have a component, $c_0$, not present in the sap of L–1. It is of interest, as well, to note the apparent contamination of supposedly separated walls of the Neisseria samples by the components $c_{10}$ in FIGURES 5A and 5C. The decay constant, associated with this component evidently indicates identity with the sap of these two strains and may be read as a quantitative indication of the amount of sap remaining in the wall preparation. FIGURES 5E and 5F show the decay curves for the whole cells of Neisseria strains 1027A and L–1 respectively. We note first that both curves are well fitted by adding the curves for the walls and saps of their respective strains. This would appear to indicate both good quantitative separation of cell wall and sap components and the lack of artifactive data in the analytical procedure; i.e. there appears to be no interference between substituents with respect to their phosphorescent signatures as well as no radiative components artificially introduced by the mechanism of study. In any case, it is clear that the decay curves permit differentiation of strains 1027A on the one hand and L–1 on the other by number of components, decay constant, and intensity coefficients and that the curves of all the samples are distinguishable by some combination of these parameters.

Thus it will be understood that each individual microorganism whether treated as a whole or divided into its substituent cell walls and cell sap has an individual "signature" based upon the formed vector $\overline{V}$ described earlier.

The graphic and textual disclosures set forth herein are exemplary only and various changes and modifications might be made therein without departing from the scope of the invention as defined by the subjoined claims. While the invention has been described herein in connection with novel combinations of specific known apparatus, such as the well known Aminco-Bowman spectrophotofluorometer to which has been applied the reservoir, the shutter system, and the Tektronics oscilloscope, it is understood that any other equivalent instrumental elements may be employed within the scope of the claims. Several commercial apparatus which perform the functions of the Aminco-Bowman spectrophotofluorometer specifically referred to herein, are presently known.

Having thus described the invention, what is claimed as new and desired to be secured by Letters Patent is:

1. The method of differential identification and analysis of microbiological systems, which comprises stabilizing such a system so that phosphorescent decay can be observed on subsequent excitation, subjecting such a system to exciting radiations for a predetermined period of time, waiting for a period of time sufficient for fluorescent emissions from the system to cease, measuring the phosphorescent emission subsequently radiated by the system and plotting said phosphorescent emissions against time, to determine the vector for the system and identifying the system from the vector so determined.

2. The method as set forth in claim 1 in which the last-named record is plotted on a logarithmic scale in the form of phosphorescent decay curves for the subject system and curves for any substituent present, derived by the piecewise subtraction of the curves of smallest slope from those of larger slope at any discontinuities found.

3. The method as set forth in claim 1 in which said system is a microbiological organism and said stabilizing step includes greatly cooling the system before phosphorescence analysis.

4. The method as set forth in claim 3 in which the organism is cooled to below approximately 100° K.

5. The method as set forth in claim 1 in which the system is subjected to exciting radiations until saturated.

6. The method of differential identification and analysis of microbiological systems, which comprises stabilizing such a system so that phosphorescent decay can be observed on subsequent excitation, subjecting such a system to exciting radiations for a predetermined period of time, said exciting radiations being such as to set up in said system an emission spectrum which may comprise scattered excitation radiation, fluorescent radiation, and phosphorescent decay radiation; and which method further comprises recording the intensity of all of such emissions as functions of wave length; and employing a selected predetermined intensity of the fluorescent radiation together with a selected predetermined intensity of the phosphorescent decay radiation as part of the characteristics of the biological system to be identified.

7. The method as set forth in claim 6 which includes eliminating the records of said scattered and fluorescent emissions and recording the wave lengths corresponding to the selected predetermined intensity of the phosphorescent emission, as identification of the subject biological system.

8. The method as set forth in claim 1 which includes providing shutter means shielding the site of the system being tested, screening the excitation radiation directed onto the site to limit the wave length to a predetermined range by means of a wave length selector having a monochromator associated therewith, similarly screening the emissions to confine them to a predetermined range of wave lengths, and recording all resulting emissions including scattered radiation, fluorescence and phosphorescent decay; the sequence of operations being substantially as follows: turning the shutter means on permitting radiation to fall on the specimen system, setting the excitation wave length screening at an arbitrary fixed position within the expected phosphorescence range, sweeping the excitation monochromator over its full range until the position of maximum intensity is found, exciting the specimen to a predetermined extent; then blocking off the recording means, locking the shutter open, and discontinuing the excitation; effecting a zero setting of the detector means, then beginning the time trace to record an oscilloscope picture of the emissions as functions of both wave length and time.

9. The method described in claim 2 which comprises recording as the unique signature of a biological system, the slopes and the Y intercepts of the curves resulting from the piece-wise subtraction in the order specified by: the smallest slope and its associated Y intercept, the next larger slope and its associated Y intercept, and in order the next larger slope and associated Y intercepts to and including the largest.

10. The method as set forth in claim 6 which includes the steps of finally determining and recording the ratio of the selected predetermined intensities of the fluorescent radiation to the selected predetermined intensities of the phosphorescent radiation.

References Cited

UNITED STATES PATENTS

| | | | |
|---|---|---|---|
| 2,971,429 | 2/1961 | Howerton | 205—71 X |
| 3,092,722 | 6/1963 | Howerton | 250—71 X |
| 3,359,973 | 12/1967 | Hoffman | 128—1 |

OTHER REFERENCES

Johnson: Abstract No. 661, published September 1950, 638 O.G. 931.

RALPH G. NILSON, Primary Examiner

M. J. FROME, Assistant Examiner

UNITED STATES PATENT OFFICE
CERTIFICATE OF CORRECTION

Patent No. 3,470,373                          September 30, 1969

Aubrey K. Brewer et al.

It is certified that error appears in the above identified patent and that said Letters Patent are hereby corrected as shown below:

Column 2, line 3, the equation should appear as shown below:

$$I_t = I_1 e^{-\lambda_1 t} + I_2 e^{-\lambda_2 t} + \ldots I_n e^{-\lambda_n t} = \Sigma_i I_i e^{-\lambda_i t}$$

same column 2, line 26, the equation should appear as shown below:

$$\overline{V} = \{\lambda_1, \lambda_2 \ldots \lambda_n, I_1, I_2 \ldots I_n, x_f, I_f, x_p, I_p\}$$

Column 5, line 52, the equation should appear as shown below:

$$C_{n\ldots 10} = C_1 e^{-\lambda_1 t} + C_2 e^{-\lambda_2 t} + \ldots + C_n e^{-\lambda_n t} \equiv \Sigma_i^n C_i e^{-\lambda_i t}$$

Signed and sealed this 1st day of September 1970.

(SEAL)
Attest:

EDWARD M. FLETCHER, JR.
Attesting Officer

WILLIAM E. SCHUYLER, JR.
Commissioner of Patents